(12) United States Patent
Ishimaru

(10) Patent No.: US 6,342,930 B2
(45) Date of Patent: *Jan. 29, 2002

(54) DISPLAY DEVICE CAPABLE OF PRODUCING A GOOD DISPLAY STATE IN PLURAL ANGLES OF VIEW

(75) Inventor: Toshiaki Ishimaru, Hino (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,168

(22) Filed: Mar. 16, 1999

(30) Foreign Application Priority Data

Mar. 19, 1998 (JP) ............................................. 10-070840

(51) Int. Cl.[7] .......................... G02F 1/13; G02F 1/1343; G03B 17/18; G03B 13/10
(52) U.S. Cl. ........................... 349/2; 349/144; 396/287; 396/378
(58) Field of Search ................................. 349/142, 143, 349/2; 396/287, 291, 292, 373, 378, 435, 436

(56) References Cited

U.S. PATENT DOCUMENTS

| 4,412,214 A | * | 10/1983 | Tanaka et al. | 345/52 |
| 6,078,755 A | * | 6/2000 | Ishimaru et al. | 396/287 |
| 6,167,203 A | * | 12/2000 | Ishimaru | 396/287 |

FOREIGN PATENT DOCUMENTS

| JP | 5-165017 | | 6/1993 |
| JP | 8-328101 | * | 12/1996 |
| JP | 2000-187454 | * | 7/2000 |

* cited by examiner

Primary Examiner—William L. Sikes
Assistant Examiner—Dung Nguyen
(74) Attorney, Agent, or Firm—Frishauf, Holtz, Goodman, Langer & Chick, P.C.

(57) ABSTRACT

A display device includes a liquid crystal capable of displaying a central region, a first peripheral region at the periphery of the central region, and a second peripheral region at the periphery of the central region and differing from the first peripheral region. A first electrode is connected to a region including the central region and first peripheral region of the liquid crystal. A second electrode is connected to a region including the central region and second peripheral region of the liquid crystal. The display regions of the liquid crystal are controlled by supplying driving signals to the first electrode and second electrode.

8 Claims, 13 Drawing Sheets

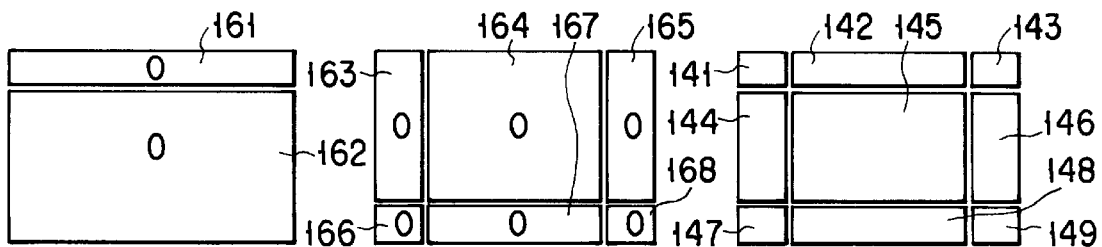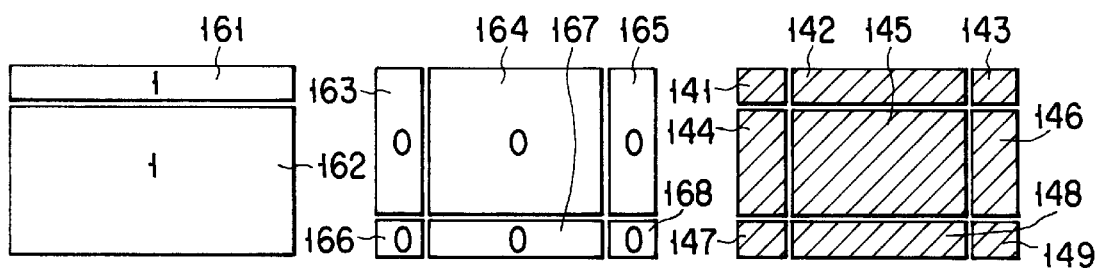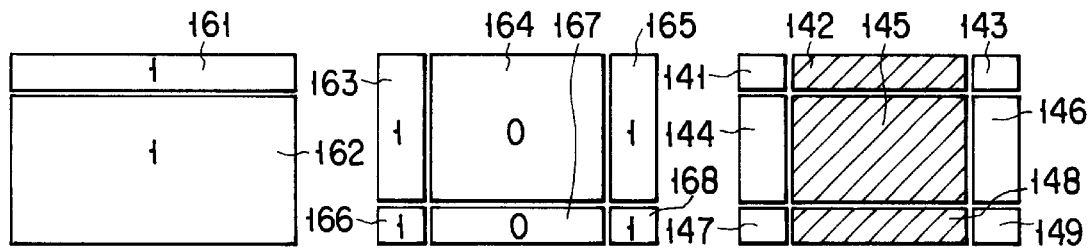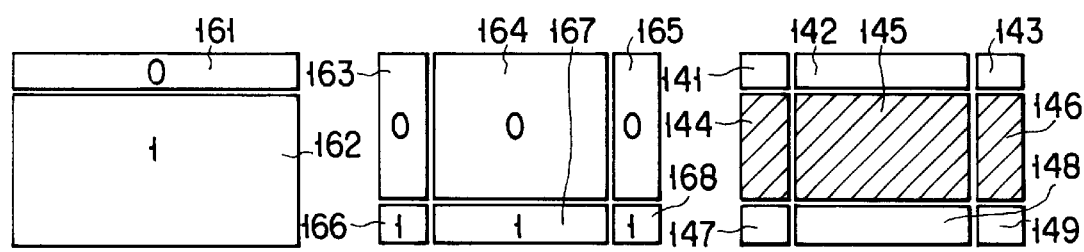

PROR ART

DISPLAY DEVICE CAPABLE OF PRODUCING A GOOD DISPLAY STATE IN PLURAL ANGLES OF VIEW

BACKGROUND OF THE INVENTION

This invention relates to a display device, and more particularly to a liquid-crystal display device that displays information in the finder of a camera.

Recently, cameras capable of taking pictures of different sizes, such as a panorama size and a normal size, have been developed. With such conventional cameras capable of taking pictures of different sizes, to display an image by switching between panorama and normal in the finder, a positive-type LCD (liquid-crystal display), such as a guest-host (GH) LCD or a twisted nematic (TN) LCD, has been used in the finder section.

The technique for using a macromolecular-dispersion-type liquid crystal in the finder of a camera has been disclosed in Jpn. Pat. Appln. KOKAI Publication No. 5-165017. This type of liquid crystal is a negative-type LCD that turns to the transmitting state when a voltage is applied and to the scattering state when no voltage is applied. Since the macromolecular-dispersion-type liquid crystal has a large degree of scattering, using it in the finder of a camera makes the amount of rays of light going directly to the pupil very small. This makes it possible to construct a finder with higher contrast than that of the twisted nematic type or the guest-host type.

Some of conventional twisted nematic LCDs are of the negative type. In recent years, negative-type liquid crystal has been available in various types.

Recent cameras, particularly cameras using a film with a magnetic recording section, have three modes of angle of view, highvision, classic, and panorama, as shown in FIGS. 25A, 25B, and 25C. According to each mode of angle of view, the corresponding display has to be made.

FIGS. 26A and 26B show the layout of a display device using a negative-type LCD to achieve the three modes of finder display by a simple method. FIG. 26A is a front view of the LCD (common; COM side) and FIG. 26B is a rear view of the LCD (segment; SEG side).

As shown in FIG. 26A, the COM side is composed of a single electrode 1. The SEG side is divided into nine regions, which include an electrode 3 in the middle, electrodes 4 and 5 provided to the right and left sides of the electrode 3, electrodes 6 and 7 provided above and below the electrode 3, and electrodes 8, 9, 10, and 11 at the corners provided between the electrode 4, 5 and the electrodes 6, 7. The electrodes on the SEG side are classified into four groups: the electrode 3 in the middle, the electrode 4, 5 at the right and left, the electrodes 6, 7 at the top and bottom, and the electrodes 8 to 11 at the corners.

The signals supplied to the individual electrodes are two types of pulses a and b, one of which is the reverse of the other in phase. With the supply of such pulses, an angle of view for highvision, classic, or panorama is created as shown in FIG. 25A, 25B, or 25C.

Specifically, in the highvision mode, signal a is supplied to the electrode 1 on the COM side and signal b is supplied to the electrodes 3 to 11 on the SEG side. As a result, all the nine regions on the SEG side are 180 degrees out-of-phase with the COM side and present the transmitting state as shown in FIG. 27A.

In the classic mode, signal a is supplied to the electrode 1 on the COM side and the electrodes 4, 5 and 8 to 11 and signal b is supplied to the electrodes 3, 6, 7 on the SEG side. As a result, the regions of the electrodes 3, 6, 7 on the SEG side are 180 degrees out-of-phase with the COM side and present the transmitting state as shown in FIG. 27B.

In the panorama mode, signal a is supplied to the electrode 1 on the COM side and the electrodes 6 to 11 on the SEG side and signal b is supplied to the electrodes 3 to 5 on the SEG side. As a result, the regions of the electrodes 3 to 5 on the SEG side are 180 degrees out-of-phase with the COM side and present the transmitting state as shown in FIG. 27C.

In such a display device, the electrode on the SEG side has been divided into nine regions and leads for drawing the electrodes outside have been formed as shown in FIG. 26B. The leads for the electrodes 4 to 11 cause no problem in running on the layout.

The lead for the electrode 3 in the middle, however, takes the form of a projecting part 13 because the electrode 3 is located in the middle of the layout. The projecting part 13 is unsightly even in the highvision or panorama mode. Particularly in the classic mode, since the projecting part 13 is visible outside the angle of view, it is very unsightly, degrading the quality of the display.

BRIEF SUMMARY OF THE INVENTION

A first object of the present invention is to provide a display device which prevents a projecting part from appearing in a display with any angle of view and making the display unsightly in a liquid crystal capable of changing the angle of view.

A second object of the present invention is to provide a display device which prevents the quality of visual field of a finder from deteriorating without increasing the accuracy of alignment of the front pattern with the back pattern in a liquid crystal capable of changing the angle of view.

To accomplish the first object, a display device according to a first aspect of the present invention comprises: a liquid crystal capable of displaying a central region, a first peripheral region at the periphery of the central region, and a second peripheral region at the periphery of the central region and differing from the first peripheral region; a first electrode connected to a region including the central region and first peripheral region of the liquid crystal; and a second electrode connected to a region including the central region and second peripheral region of the liquid crystal, wherein the display regions of the liquid crystal are controlled by supplying driving signals to the first electrode and second electrode.

To accomplish the first object, a display device according to a second aspect of the present invention comprises: a transmission-type liquid crystal which enables a central region, a first peripheral region at the periphery of the central region, and a second peripheral region at the periphery of the central region and differing from the first peripheral region to transmit light; a first electrode pattern which is provided on a first face that holds a liquid crystal agent of the transmission-type liquid crystal sandwiched and which includes the central region and the first peripheral region; a second electrode pattern which is provided on a second face that faces the first face that holds the liquid crystal agent of the transmission-type liquid crystal sandwiched and which includes the central region and the second peripheral region, wherein the transmitting regions of the transmission-type liquid crystal are controlled by supplying driving signals to the first electrode pattern and the second electrode pattern.

To accomplish the first object, a display device according to a third aspect of the present invention comprises: a transmission-type liquid crystal which enables a central region, a first peripheral region at the periphery of the central region, and a second peripheral region at the periphery of the central region and differing from the first peripheral region to transmit light; a first electrode pattern which is provided on a first face that holds a liquid crystal agent of the transmission-type liquid crystal sandwiched and which includes the central region and the first peripheral region; a second electrode pattern which is provided on a second face that faces the first face that holds the liquid crystal agent of the transmission-type liquid crystal sandwiched and which includes the central region and the second peripheral region; a third electrode pattern which is provided on the first face and includes the second peripheral region; and a fourth electrode pattern which is provided on the second face and includes the first peripheral region, wherein the transmitting regions of the transmission-type liquid crystal are selected by supplying driving signals to the first electrode pattern, the second electrode pattern, the third electrode pattern, and the fourth electrode pattern.

To accomplish the first object, a display device according to a fourth aspect of the present invention comprises: a transmission-type liquid crystal which enables a central region, a first peripheral region at the periphery of the central region, and a second peripheral region at the periphery of the central region and differing from the first peripheral region to transmit light; a first electrode pattern provided on one side of the transmission-type liquid crystal; and a second electrode pattern provided on the other side of the transmission-type liquid crystal and facing the first electrode pattern, wherein the first electrode pattern includes the central region and the first peripheral region, the second electrode pattern includes the central region and the second peripheral region, and the transmitting regions of the transmission-type liquid crystal are controlled by supplying driving signals to the first electrode pattern and the second electrode pattern.

According to a fifth aspect of the present invention, to accomplish the second object, there is provided a display device for a camera which uses a liquid crystal to make a display in plural screen sizes in the finder visual field of the camera, comprising: a first face electrode which is provided on a first face of the liquid crystal and composed of plural electrodes and a first inter-electrode region, the first inter-electrode region being a region between the plural electrodes where no electrode exists; a second face electrode which is provided on a second face facing the first face of the liquid crystal and is composed of plural electrodes and a second inter-electrode region, the second inter-electrode region being a region between the plural electrodes where no electrode exists, wherein a central region enclosed only by the first inter-electrode region and the second inter-electrode region is formed in the finder visual field, and a display is made according to the screen size within the finder by supplying driving signals to the first face electrode and second face electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 21A, 21B, and 21C show the display off state in the fifth embodiment, FIG. 21A showing the state of the electrodes on the COM side, FIG. 21B showing the state of the electrodes on the SEG side, and FIG. 21C showing the finder visual field range produced by the electrodes of FIGS. 20A and 20B;

FIGS. 22A, 22B, and 22C illustrate an angle of view for highvision display in the fifth embodiment, FIG. 22A showing the relationship between the electrodes on the COM side and the supplied signals, FIG. 22B showing the relationship between the electrodes on the SEG side and the supplied signals, and FIG. 22C showing an angle of view for highvision display produced from FIGS. 22A and 22B;

FIGS. 23A, 23B, and 23C illustrate an angle of view for classic display in the fifth embodiment, FIG. 23A showing the relationship between the electrodes on the COM side and the supplied signals, FIG. 23B showing the relationship between the electrodes on the SEG side and the supplied signals, and FIG. 23C showing an angle of view for panorama display produced from FIGS. 23A and 23B;

FIGS. 24A, 24B, and 24C illustrate an angle of view for panorama display in the fifth embodiment, FIG. 24A showing the relationship between the electrodes on the COM side and the supplied signals, FIG. 24B showing the relationship between the electrodes on the SEG side and the supplied signals, and FIG. 24C showing an angle of view for classic display produced from FIGS. 24A and 24B;

DETAILED DESCRIPTION OF THE INVENTION

Hereinafter, referring to the accompanying drawings, embodiments of the present invention will be explained.
(First Embodiment)

Figure 1A:
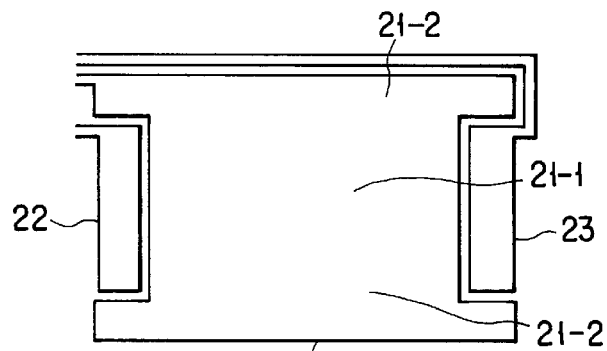
FIGS. 1A and 1B illustrate a first embodiment of the present invention, showing a layout of the electrodes of a display device that has used a negative-type LCD for the finder of a camera, FIG. 1A being a front view of the LCD (common; COM side) and FIG. 1B being a rear view of the LCD (segment; SEG side)
Figure 1B:
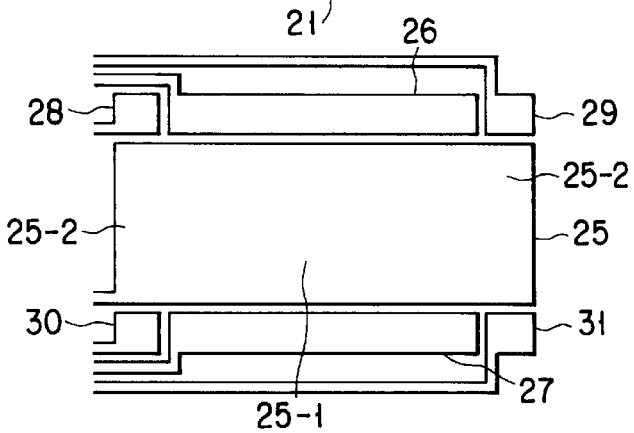

FIGS. 1A and 1B relate to a first embodiment of the present invention and show a layout of the electrodes of a display device that has used a negative-type LCD for the finder of a camera. FIG. 1A is a front view of the LCD (common; COM side). FIG. 1B is a rear view of the LCD (segment; SEG side).

As shown in FIG. 1A, the electrode on the COM side is divided into three regions or electrodes, a first electrode 21 and third electrodes 22 and 23 provided to the right and left sides of the first electrode 21. Namely, the electrode on the COM side is composed of two types of electrodes, the first electrode 21 and the third electrodes 22, 23.

On the other hand, as shown in FIG. 1B, the electrode on the SEG side is divided into seven regions or electrodes, a second electrode 25 occupying the central portion, fourth electrodes 26 and 27 provided above and below the second electrode, fifth electrodes 28, 29 and 30, 31 provided respectively to the right and left sides of the fourth electrodes 26 and 27. Namely, the electrode on the SEG side is composed of three types of electrodes, the second, fourth, and fifth electrodes 25 to 31.

Specifically, a first electrode (first electrode pattern) corresponds to the first electrode 21 provided on the COM side of the negative-type LCD and includes a central region 21-1 and a first peripheral region 21-2. A third electrode (third electrode pattern) corresponds to the third electrodes 22, 23 provided on the COM side of the negative-type LCD and includes second peripheral regions (the electrode portions indicated by numerals 22, 23).

A second electrode (second electrode pattern) corresponds to the second electrode 25 provided on the SEG side of the negative-type LCD and includes a central region 25-1 and a second peripheral region 25-2. A fourth electrode (fourth electrode pattern) corresponds to the fourth electrodes 26, 27 provided on the SEG side of the negative-type LCD and includes first peripheral regions (portions indicated by numerals 26, 27).

Figure 26A:
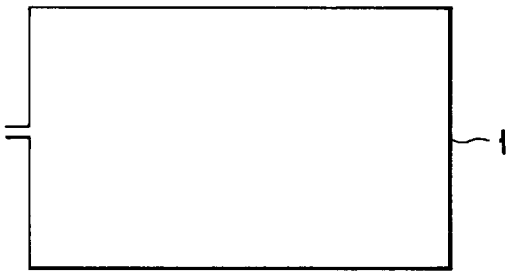
FIGS. 26A and 26B show a layout of a display device using a conventional negative-type LCD, FIG. 26A being a front view of the LCD (common; COM side) and FIG. 26B being a rear view of the LCD (segment; SEG side)
Figure 26B:
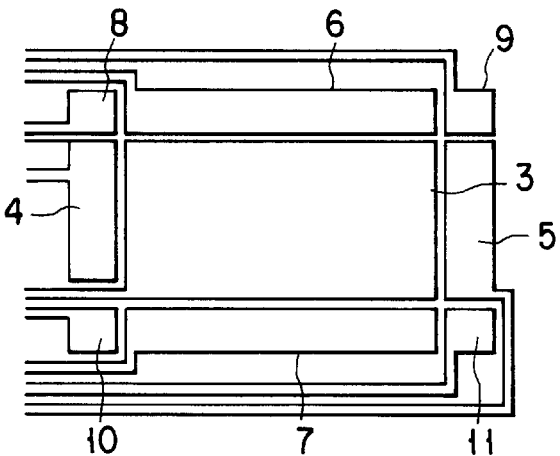

In the conventional display device of FIGS. 26A and 26B, the electrode 3 of the central portion on the SEG side was a region independent of its surrounding electrode regions. In contrast, in the first embodiment, on the COM side (FIG. 1A), the electrode of the central portion and the electrodes above and below it are integrated into a single region (electrode 21). On the SEG side (FIG. 1B), the electrode of the central portion and the electrodes to the right and left sides of it are integrated into a single region (electrode 25).

This eliminates the process of providing a projecting part for the electrode of the central portion to supply an external signal to the electrode as found in the prior art. With the LCD having a region including the central portion and its peripheral portions on each of the COM and SEG sides, the central portion without an unnecessary projecting part can be displayed by making a display on the display section with the independent central portion.

A method of displaying an angle of view for each of highvision, classic, and panorama display will be described by reference to FIGS. 2A, 2B, and 2C.

First, highvision angle-of-view display will be explained by reference to FIGS. 2A, 2B, and 2C.

Figure 2A:
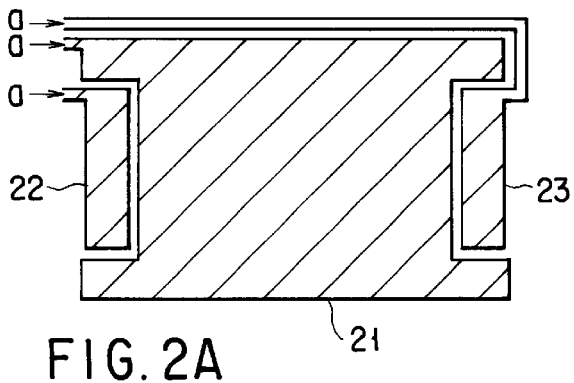
FIGS. 2A, 2B, and 2C illustrate an angle of view for highvision display, FIG. 2A showing the relationship between the electrodes on the COM side and the supplied signals, FIG. 2B showing the relationship between the electrodes on the SEG side and the supplied signals, and FIG. 2C showing an angle of view for highvision display produced from FIGS. 2A and 2B.
Figure 2C:
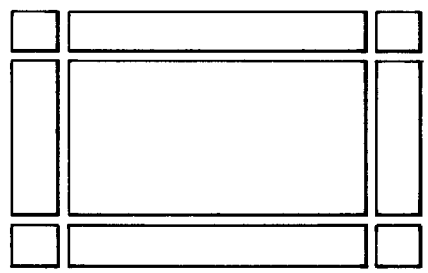
Figure 2B:
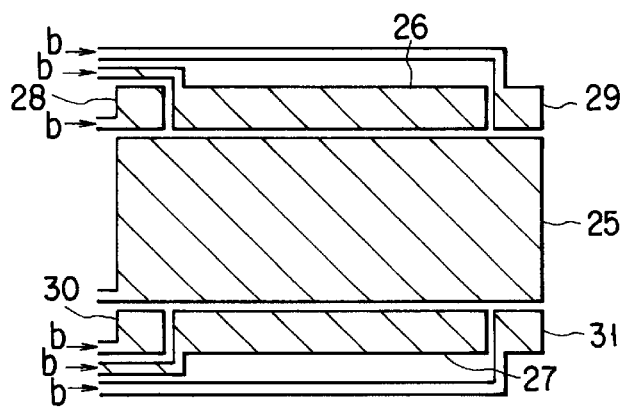
Figure 28A:
FIGS. 28A and 28B show an example of signals supplied to the display device using the negative-type LCD.

In this case, on the COM side, signal a of FIG. 28A is supplied to the first electrode 21 and third electrodes 22, 23 as shown in FIG. 2A. On the other hand, on the SEG side, signal b of FIG. 28 is supplied to all of the second electrode 25, fourth electrodes 26, 27, and fifth electrodes 28 to 31 as shown in FIG. 2B.

Figure 27A:
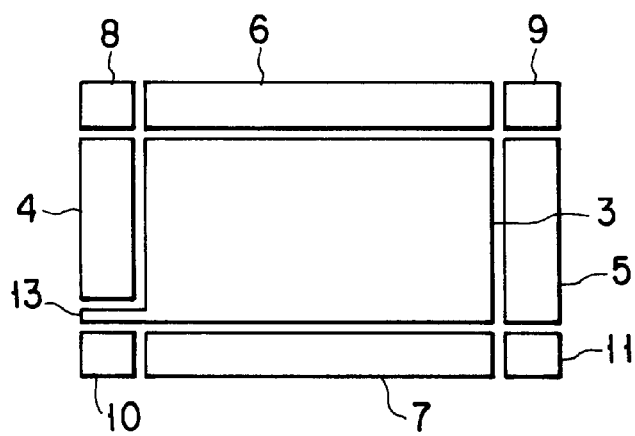
FIGS. 27A, 27B, and 27C show examples of displaying an angle of view on the display device with the layout of FIGS. 26A and 26B, FIG. 27A showing an angle of view for highvision display, FIG. 27B showing an angle of view for classic display, and FIG. 27C showing an angle of view for panorama display.
Figure 27B:
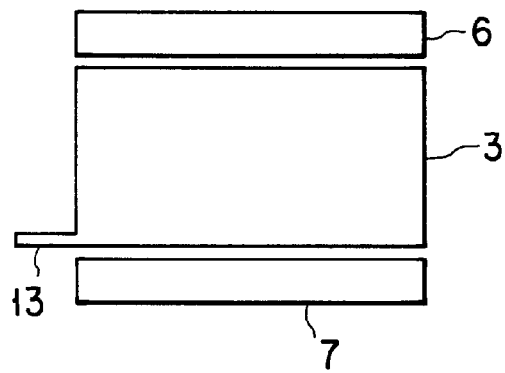
Figure 27C:
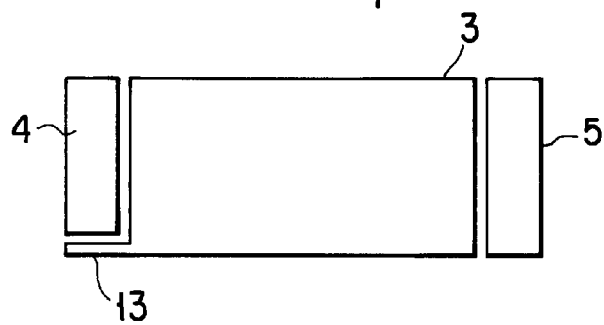

The display device is composed of a negative-type LCD, which presents the transmitting state when a voltage is applied and the scattering state when no voltage is applied. Therefore, when a voltage is applied to the shaded electrodes in FIG. 2A and a 180 degrees out-of-phase voltage is applied to the shaded electrodes in FIG. 2B, this turns all the nine regions into transmitting sections, making a highvision display as shown in FIG. 2C. As a result, the projecting part 13 as shown in FIGS. 27A, 27B, and 27C does not appear.

Next, panorama angle-of-view display will be explained by reference to FIGS. 3A, 3B, and 3C.

Figure 3A:
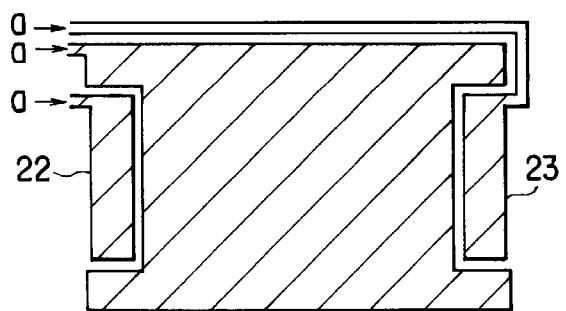
FIGS. 3A, 3B, and 3C illustrate an angle of view for panorama display, FIG. 3A showing the relationship between the electrodes on the COM side and the supplied signals, FIG. 3B showing the relationship between the electrodes on the SEG side and the supplied signals, and FIG. 3C showing an angle of view for panorama display produced from FIGS. 3A and 3B.

As shown in FIG. 3A, on the COM side, signal a of FIG. 28A is supplied to the first electrode 21 and third electrodes 22, 23. On the SEG side, as shown in FIG. 3B, signal b of FIG. 28B is supplied to the second electrode 25 and signal a of FIG. 28A is supplied to the fourth and fifth electrodes 26 to 31.

Figure 3C:
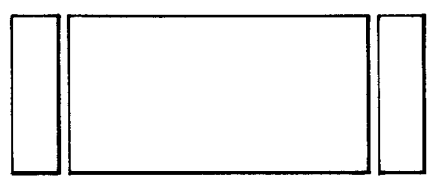
Figure 3B:
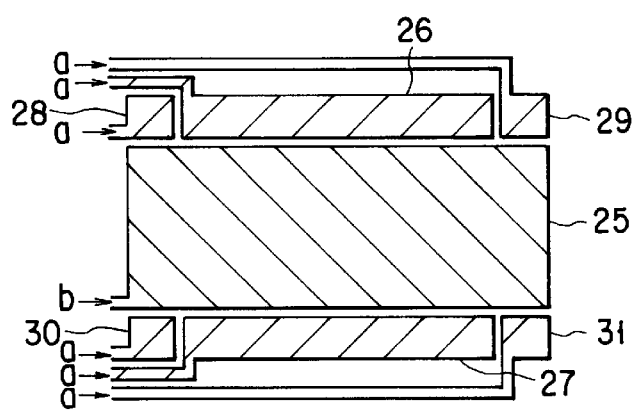

As a result, only the region corresponding to the second electrode 25 turns into a transmitting section, making a panorama display as shown in FIG. 3C. In this display state, too, the projecting part 13 as shown in FIGS. 27A, 27B, and 27C does not appear.

Classic angle-of-view display will be described by reference to FIGS. 4A, 4B, and 4C.

Figure 4A:
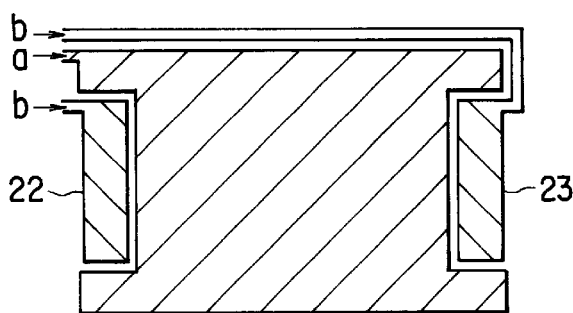
FIGS. 4A, 4B, and 4C illustrate an angle of view for classic display, FIG. 4A showing the relationship between the electrodes on the COM side and the supplied signals, FIG. 4B showing the relationship between the electrodes on the SEG side and the supplied signals, and FIG. 4C showing an angle of view for classic display produced from FIGS. 4A and 4B.
Figure 28B:

As shown in FIG. 4A, on the COM side, signal a of FIG. 28A is supplied to the first electrode 21 and signal b of FIG. 28B is supplied to the third electrodes 22, 23. On the other hand, on the SEG side, signal b of FIG. 28B is supplied to the second electrode 25 and fourth electrodes 26, 27 and signal a of FIG. 28A is supplied to the fifth electrodes 28 to 31.

Figure 4C:
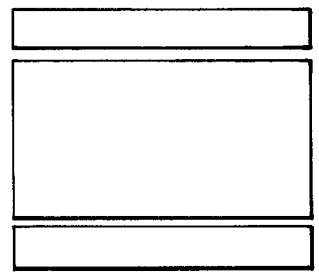
Figure 4B:
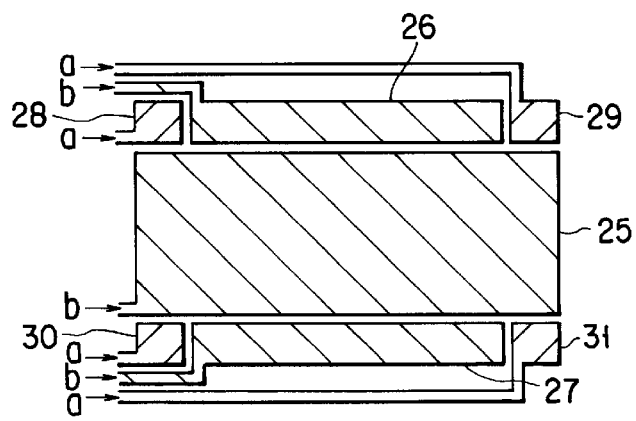

As a result, of the nine regions, or the left, central, and right regions, the central one turns into a transmitting section, making a classic display as shown in FIG. 4C. In this case, too, the projecting part 13 as shown in FIGS. 27A, 27B, and 27C does not appear.

With the first embodiment, neither highvision, panorama, nor classic display is unsightly on the camera finder. This ensures a high-quality display.

(Second Embodiment)

A case where a display device of the present invention has been applied to a field unrelated to cameras will be explained.

FIGS. 5A to 8 relate to a second embodiment of the present invention and show layouts in a case where the display device has been applied to the dial plate of a watch.

Figure 5A:
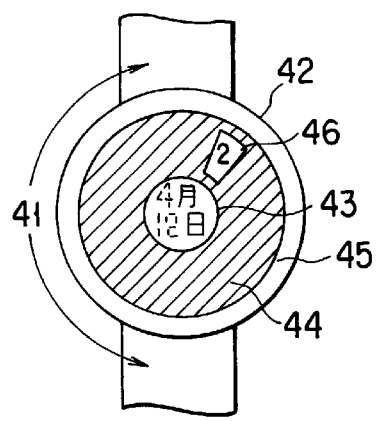
FIGS. 5A to 5D illustrate an example of applying a display device to the dial plate of a watch in a second embodiment of the present invention, FIG. 5A being an external view of a watch, FIG. 5B showing the dial of the watch, FIG. 5C showing an arrangement of the terminal on the COM side, and FIG. 5D showing an arrangement of the terminals on the SEG side.

As shown in an external view of FIG. 5A, in the watch of the second embodiment, "month" and "day" are represented in the central portion 43 of a dial 42 provided on a belt 41. A peripheral section 44 representing "hour" is formed between the central portion 43 and a frame 45 in such a manner that it encloses the central portion. In the peripheral section 44, a transmitting section 46 for displaying only the relevant "hour" is provided.

Specifically, in the peripheral section 44 making no display, the portion corresponding to the present time becomes transparent and constitutes a transmitting section 46, with the remaining part of the liquid crystal being in the scattering state and appearing frosted.

Figure 5B:
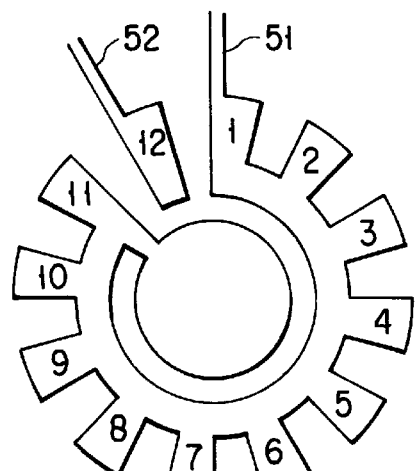
Figure 5C:
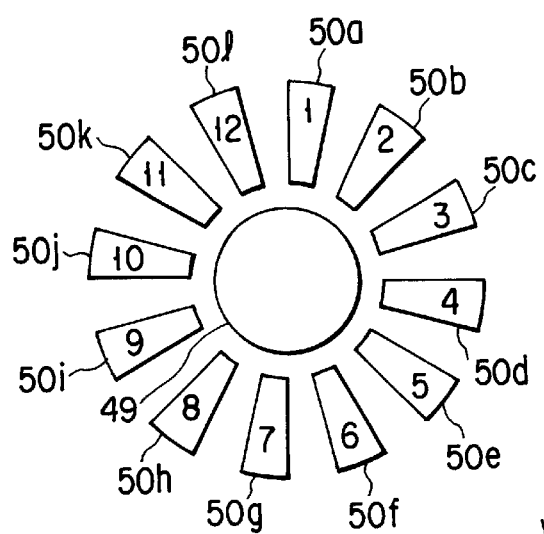

The dial plate 42 of the watch according to the second embodiment is composed of a circular display section 49 in the middle and twelve numeral sections 50a to 50l provided around the display section 49 as shown in FIG. 5C. A macromolecular-dispersion-type liquid crystal is provided on the front of the display section 49 and numeral sections 50a to 50l. The display section 49 of the central portion is always in the transmitting state. One of the numeral sections 50a to 50l corresponding to the present time goes into the transmitting state and the remaining ones are in the scattering state. This provides a high-quality display, where the present time appears distinctly through the transparent portion of the frosted glass.

As shown in FIG. 5B, on the COM side, numerals 1, 2, 3, 4, 5, 6, 7, 8, 9, 10, 11, and the central portion are formed integrally and connected to a terminal 51.

Numeral 12 is connected to a terminal 52.

Figure 5D:
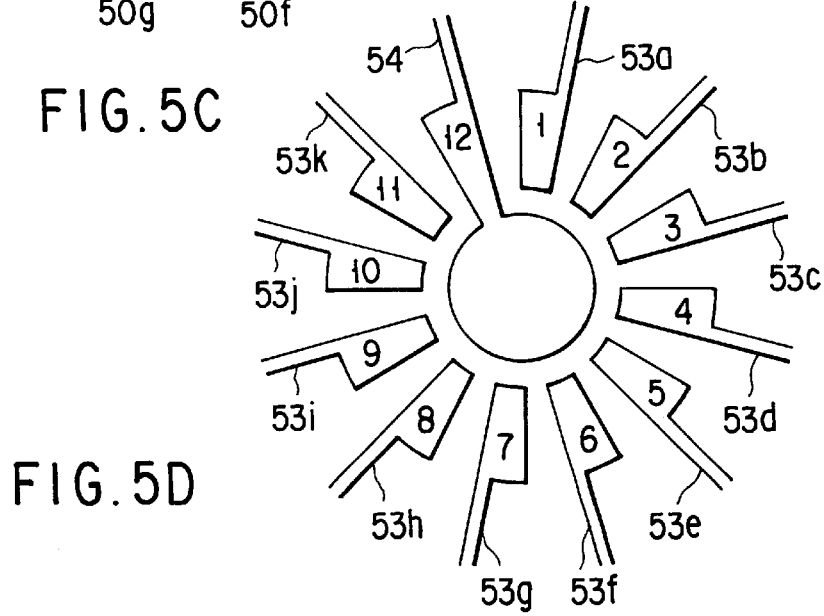
Figure 6A:
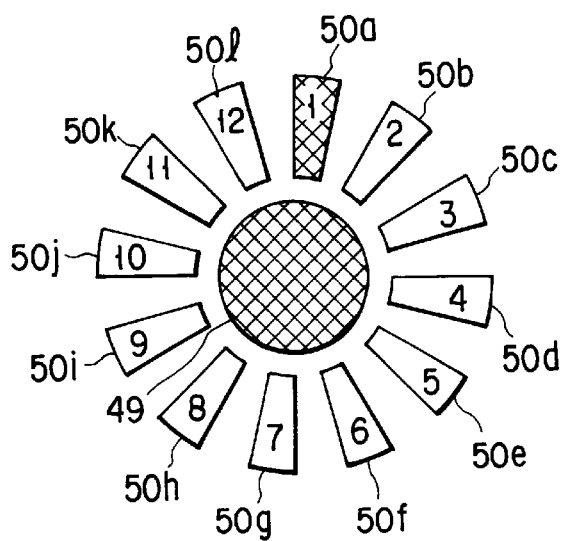
FIG. 6A shows an example of displaying one o'clock by the watch of FIG. 5B.
Figure 6B:
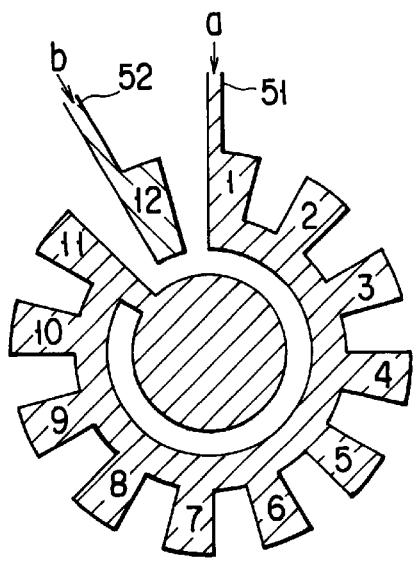
FIG. 6B shows the relationship between the terminals on the COM side and the supplied signals.
Figure 6C:
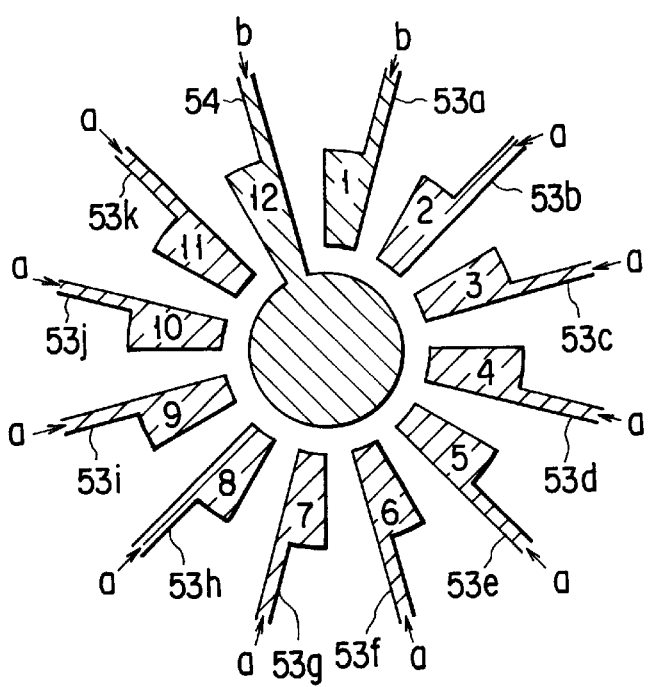
FIG. 6C shows the relationship between the terminals on the SEG side and the supplied signals.

On the other hand, on the SEG side, numerals 1 to 11 are connected to terminals 53a to 53k, respectively, as shown in FIG. 5D. Numeral 12 and the central portion are connected to a terminal 54. For example, to display one o'clock, the numeral section 50a for numeral "1" and the display section 49 of the central portion turn into the transmitting state as shown in FIG. 6A. In this case, as shown in FIG. 6B, on the COM side, signal a of FIG. 28A is supplied to the terminal 51 and signal b of FIG. 28B is supplied to the terminal 52. On the SEG side, signal a of FIG. 28A is supplied to the terminals 53b to 53k and signal b of FIG. 28B is supplied to the terminal 53a and terminal 54 as shown in FIG. 6C.

Figure 7A:
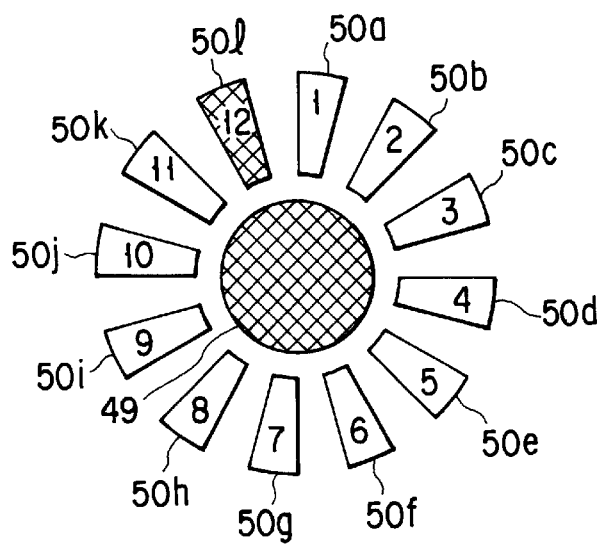
FIG. 7A shows an example of displaying twelve o'clock by the watch of FIG. 5B.
Figure 7B:
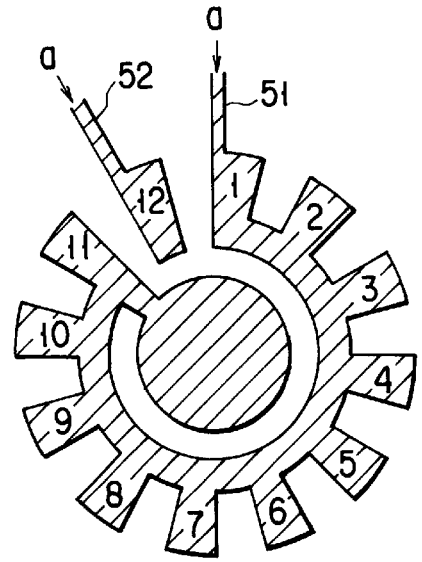
FIG. 7B shows the relationship between the terminals on the COM side and the supplied signals.
Figure 7C:
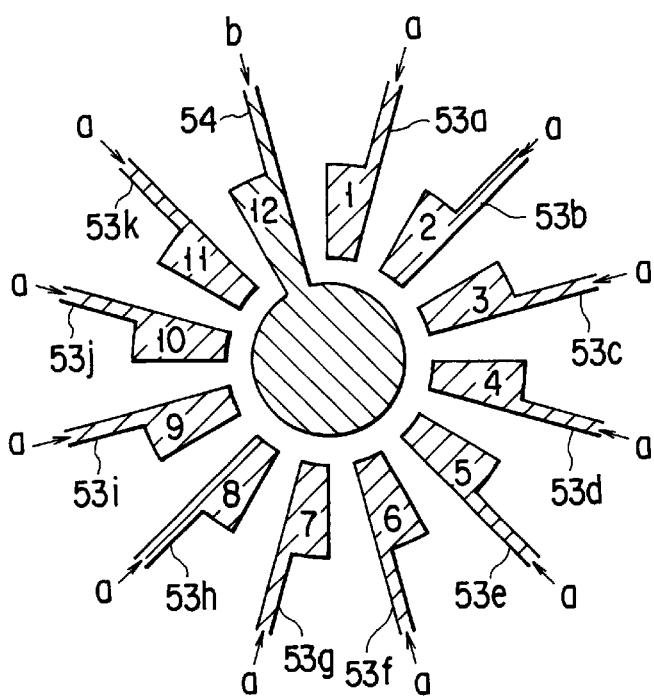
FIG. 7C shows the relationship between the terminals on the SEG side and the supplied signals.

To display each of two to eleven o'clock, signal b is supplied only to the corresponding terminal on the SEG side in the same manner as displaying one o'clock. As shown in FIG. 7A, when twelve o'clock is displayed, the numeral section 50l for numeral "12" and the display section 49 of the central portion turn into the transmitting state. To do this, signal a of FIG. 28A is supplied to the terminals 51, 52 on the COM side and to the terminals 53a to 53k on the SEG side and signal b of FIG. 28B is supplied to the terminal 54 as shown in FIG. 7B.

With this configuration, a wire need not be run between the numeral sections to wire the central portion, making it possible to narrow the spacing between the numeral sections.

Figure 8:
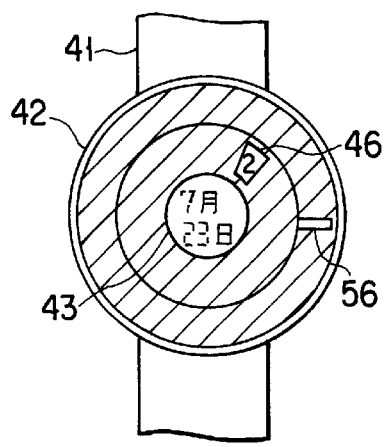
FIG. 8 shows an example of a wristwatch with a minute dial provided outside the hour dial of the watch of FIG. 5A.

FIG. 8 shows an example of a wristwatch with a minute display pattern 56 provided outside the hour display section of the watch of FIG. 5A.

Such a pattern is achieved easily by providing a similar pattern to the one connected to the terminal 51 on the COM side of FIG. 5B outside the pattern of the numeral section for "hour" display.

With this configuration, too, a wire need not be run between the patterns, making it easier to create a pattern for 60 numeral sections for "minute" display.

Therefore, according to the first and second embodiments, it is possible to provide a display device which prevents a projecting section from appearing in any angle-of-view display and making the display unsightly in a liquid crystal capable of changing the angle of view.

(Third Embodiment)

In the manufacture of LCDs, the front pattern position is aligned with the back pattern position to laminate large glass sheets on which a pattern for many LDCs has been formed. Thereafter, the laminated glass sheets are cut to produce a large number of LCDs at a time. The aforementioned spacing has a width of about 20 to 30 μm. This value is determined in the manufacture. Therefore, it is difficult to align the front pattern with the back one accurately. When the wiring section is very fine, even a slight misalignment in the lamination of the front and back patterns would permit non-wiring sections to makes two lines, which might degrading the quality of visual field of a finder.

The object of a third embodiment of the present invention is to provide a display device for a camera which prevents the quality of visual field of a finder from deteriorating without increasing the accuracy of alignment of the front pattern with the back pattern.

Figure 9A:
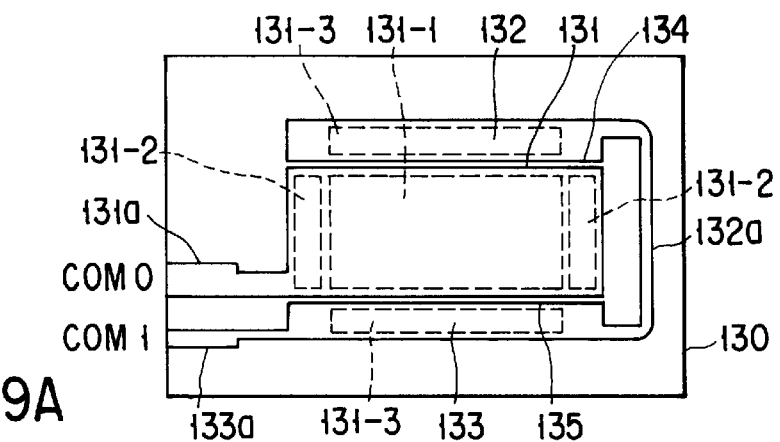
FIGS. 9A and 9B show a layout of the electrodes of a display device using a negative-type LCD for the finder of a camera according to a third embodiment of the present invention, FIG. 9A being a front view of the LCD (common; COM side) and FIG. 9B being a rear view of the LCD (segment; SEG side)
Figure 9B:
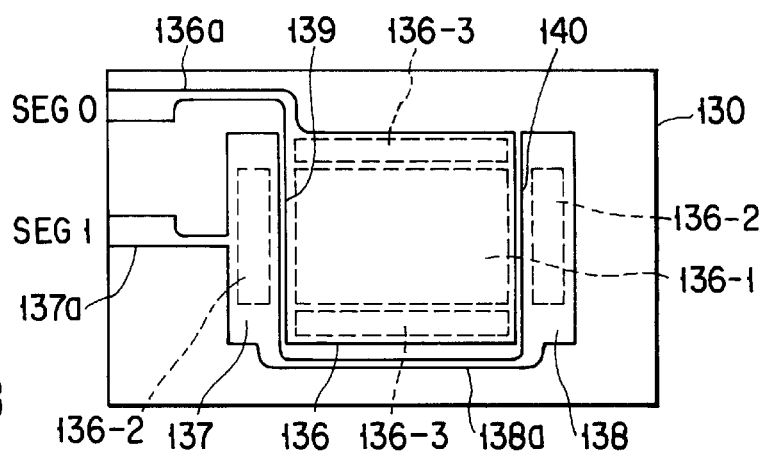

FIGS. 9A and 9B relate to the third embodiment and show a layout of the electrodes of a display device using a negative-type LCD for the finder of a camera. Numeral 130 indicates a finder. FIG. 9A is a front view of the LCD (common; COM side). FIG. 9B is a rear view of the LCD (segment; SEG side).

As shown in FIG. 9A, the electrode on the COM side is divided into three regions or three electrodes. Specifically, the electrode on the COM side is composed of a first electrode 131 acting as a first face electrode, a second electrode 132 and third electrode 133 acting as the first face electrode provided above and below the first electrode 131. A wiring section 131a is connected to the first electrode 131 and a wiring section 133a is connected to the third electrode 133. A wiring section 132a connects the second electrode 132 to the third electrode 133. In FIG. 9A, an electrodeless inter-electrode region 134 is provided horizontally between the first electrode 131 and second electrode 132 and an electrodeless inter-electrode region 135 is provided horizontally between the first electrode 131 and third electrode 133.

On the other hand, as shown in FIG. 9B, the electrode on the SEG side is divided into three regions or three electrodes. Specifically, the electrode on the SEG side is composed of a fourth electrode acting as a second face electrode, a fifth electrode 137 and sixth electrode 138 acting as the second face electrode provided to the right and left sides of the fourth electrode 136. As on the COM side, a wiring section 136a is connected to the fourth electrode 136 and a wiring section 137a is connected to the fifth electrode 137. A wiring section 138a connects the fifth electrode 137 to the sixth electrode 138. In FIG. 9B, an electrodeless inter-electrode region 139 is provided vertically between the fourth electrode 136 and fifth electrode 137 and an electrodeless inter-electrode region 140 is provided vertically between the fourth electrode 136 and sixth electrode 138.

Specifically, a first electrode (a first electrode pattern) corresponds to the first electrode 131 provided on the COM side of the negative-type LCD and includes a central region 131-1 and a first peripheral region 131-2. A third electrode (a third electrode pattern) corresponds to a second electrode 132 and third electrode 133 provided on the COM side of the negative-type LCD and includes a second peripheral region (the electrode portions indicated by numeral 131-3).

A second electrode (a second electrode pattern) corresponds to the fourth electrode 136 provided on the SEG side of the negative-type LCD and includes a central region 136-1 and a second peripheral region 136-3. A fourth electrode (a fourth electrode pattern) corresponds to the fifth electrode 137 and sixth electrode 138 provided on the SEG side of the negative-type LCD and includes a first peripheral region (the portions indicated by numeral 136-2).

Figure 10A:
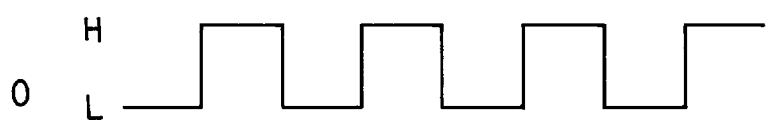
FIGS. 10A and 10B show an example of signals supplied to the display device using a negative-type LCD.
Figure 10B:
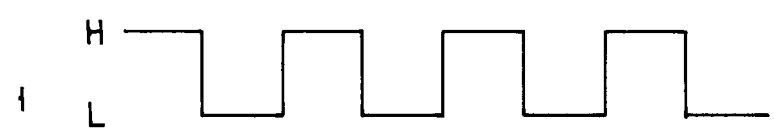

With such a configuration, the signals supplied to the individual electrodes are two types of pulse, signal "0" and signal "1," one of which is the reverse of the other in phase, as shown in FIGS. 10A and 10B. In the negative-type LCD, the LCD goes into the transmitting state when a voltage of opposite phase is applied, and turns into the scattering state when an in-phase voltage is applied.

Therefore, applying a combination of the aforementioned signals to the individual electrodes enables an angle of view to be constructed for highvision, classic, or panorama display.

Figures 11A, 11B, 11C:
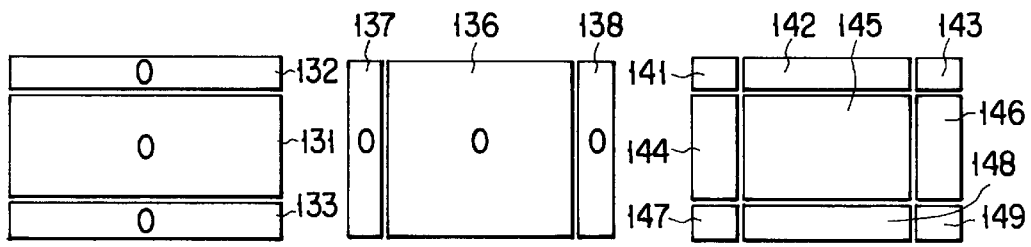
FIGS. 11A, 11B, and 11C show the display off state in the third embodiment, FIG. 11A showing the state of the electrodes on the COM side, FIG. 11B showing the state of the electrodes on the SEG side, and FIG. 11C showing the finder visual field range produced by the electrodes of FIGS. 11A and 11B.

FIGS. 11A, 11B, and 11C show the display off state in the third embodiment. FIG. 11A shows the state of the electrodes on the COM side. FIG. 11B shows the state of the electrodes on the SEG side. FIG. 11C shows the finder visual field range produced by the electrodes of FIGS. 11A and 11B.

In the display off state, no signal is supplied to the first to third electrodes 131 to 133 as shown in FIG. 11A, presenting the "0" state. Similarly, no signal is supplied to the fourth to sixth electrodes 136 to 138 as shown in FIG. 11B, presenting the "0" state. As a result, the visual field range composed of the regions 141 to 149 goes into the shading state.

Figures 12A, 12B, 12C:
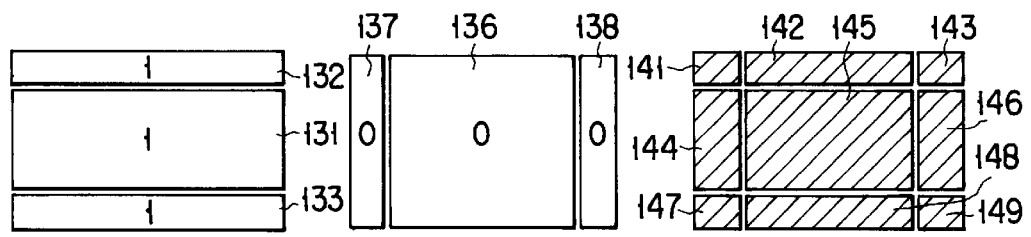
FIGS. 12A, 12B, and 12C illustrate an angle of view for highvision display in the third embodiment, FIG. 12A showing the relationship between the electrodes on the COM side and the supplied signals, FIG. 12B showing the relationship between the electrodes on the SEG side and the supplied signals, and FIG. 12C showing an angle of view for highvision display produced from FIGS. 12A and 12B.

In highvision display, signal "1" is supplied to the first to third electrodes 131 to 133 on the COM side as shown in FIG. 12A and signal "0" is supplied to the fourth to sixth electrodes on the SEG side as shown in FIG. 12B. As a result, all the three electrodes on the SEG side have the opposite phase to that of the electrodes on the COM side, bringing all the regions 141 to 149 in the visual field range into the transmitting state as shown in FIG. 12C. In FIG. 12C, the shaded sections are in the transmitting state.

Figures 13A, 13B, 13C:
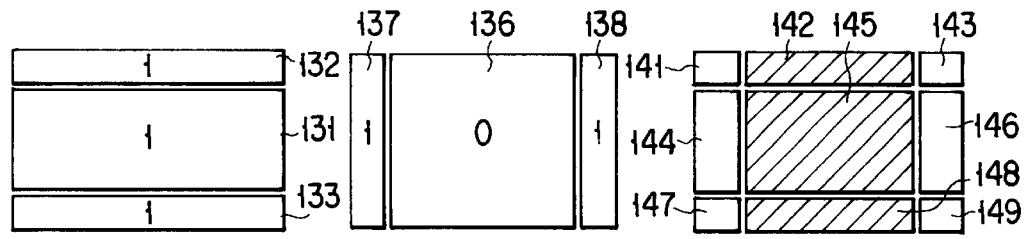
FIGS. 13A, 13B, and 13C illustrate an angle of view for classic display in the third embodiment, FIG. 13A showing the relationship between the electrodes on the COM side and the supplied signals, FIG. 13B showing the relationship between the electrodes on the SEG side and the supplied signals, and FIG. 13C showing an angle of view for classic display produced from FIGS. 13A and 13B.

In classic display, signal "1" is supplied to the first to third electrodes 131 to 133 on the COM side as shown in FIG. 13A. On the other hand, signal "0" is supplied to the fourth electrode and signal "1" is supplied to the fifth and sixth electrodes on the SEG side as shown in FIG. 13B.

As a result, as shown in FIG. 13C, the sections where the COM-side electrodes overlap with the SEG-side electrodes in the region 142, 145, and 148 of the visual field range have the opposite phase, presenting the transmitting state (the shaded portions). In this case, in the regions 141, 143, 144, 146, 147, 149, the COM-side electrodes are in phase with the SEG-side electrodes, presenting the shading state.

Figures 14A, 14B, 14C:
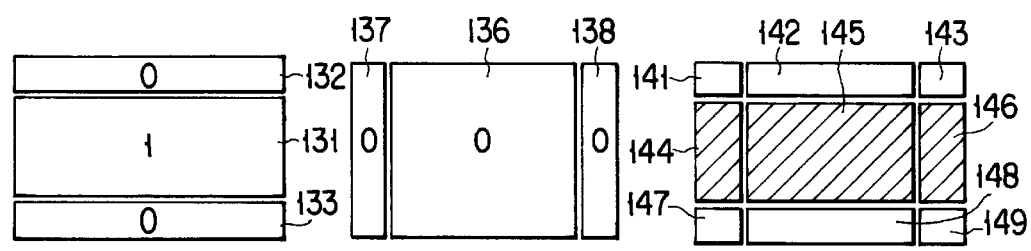
FIGS. 14A, 14B, and 14C illustrate an angle of view for panorama display in the third embodiment, FIG. 14A showing the relationship between the electrodes on the COM side and the supplied signals, FIG. 14B showing the relationship between the electrodes on the SEG side and the supplied signals, and FIG. 14C showing an angle of view for panorama display produced from FIGS. 14A and 14B.

In panorama display, as shown in FIG. 14A, signal "1" is supplied to the first electrode 131 and signal "0" is supplied to the second electrode 132 and third electrode 133 on the COM side. On the other hand, signal "0" is supplied to the fourth to sixth electrodes 136 to 138 on the SEG side.

As a result, as shown in FIG. 14C, the sections where the COM-side electrodes overlap with the SEG-side electrodes in the region 144 to 146 of the visual field range have the opposite phase, presenting the transmitting state (the shaded portions). In this case, in the regions 141 to 143 and 147 to 149, the COM-side electrodes are in phase with the SEG-side electrodes, presenting the shading state.

With such a layout of the electrodes, the region 145 surrounded by the electrodeless inter-electrode regions 134, 135, 139, 140 can be connected at its non-inter-electrode region to the peripheral electrodes on both the COM side and the SEG side. In other words, the region 145 in the central portion of the visual field range is a region formed by crossing the inter-electrode regions 134, 135, 139, 140 on the COM side and SEG side.

Since the inter-electrode regions 134, 135 on the COM side cross the inter-electrode regions 139, 140 on the SEG side and do not overlap with the latter in the same direction, a shift in the lamination of the COM-side pattern and the SEG-side pattern would not permit the inter-electrode regions to make two lines.

While in the third embodiment, the wiring section 132*a* has been provided between the second electrode 132 and third electrode 133 and the wiring section 138*a* is provided between the fifth electrode 137 and sixth electrode 138, the present invention is not restricted to this. For instance, signal supply wiring sections may be drawn from the individual electrodes.

(Fourth Embodiment)

A fourth embodiment of the present invention will be explained.

In the embodiments explained below, the same parts as those in the third embodiment are indicated by the same reference symbols and their explanation will not be given.

Figure 15A:
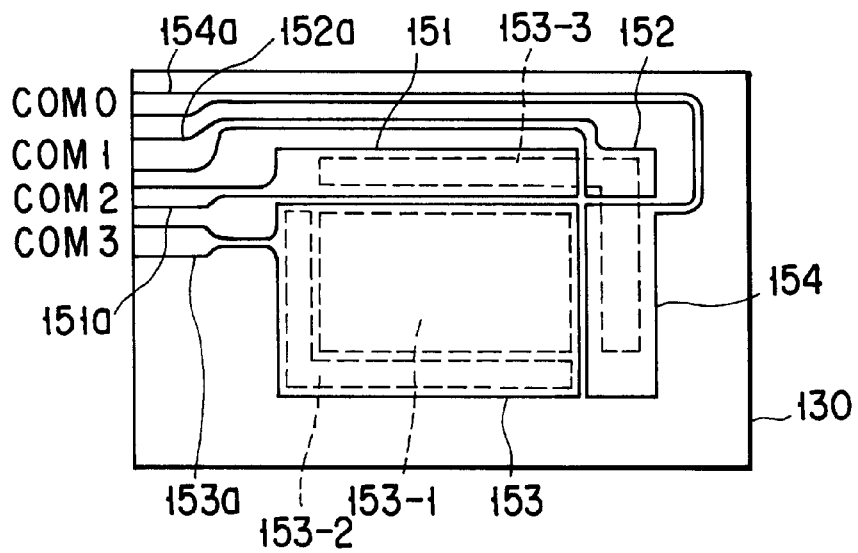
FIGS. 15A and 15B show a layout of the electrodes of a display device using a negative-type LCD for the finder of a camera according to a fourth embodiment of the present invention, FIG. 15A being a front view of the LCD (common; COM side) and FIG. 15B being a rear view of the LCD (segment; SEG side)
Figure 15B:
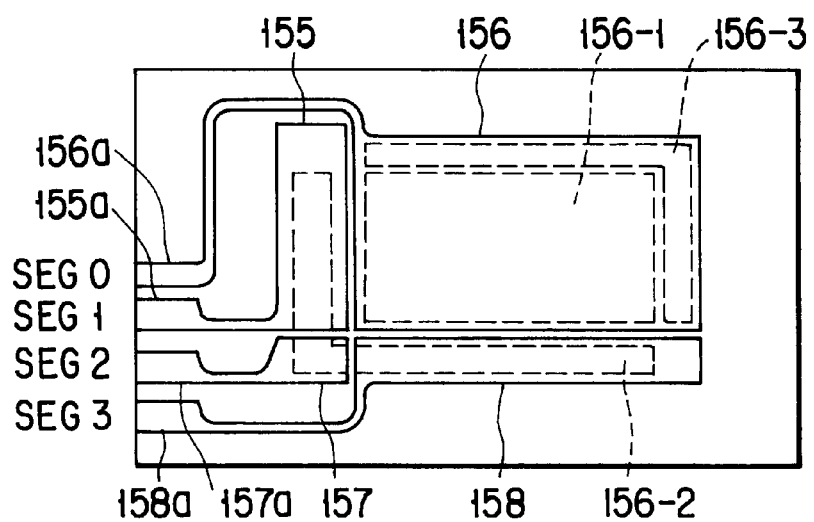

FIGS. 15A and 15B relate to the fourth embodiment and show a layout of the electrodes of a display device using a negative-type LCD for the finder of a camera. FIG. 15A is a front view of the LCD (common; COM side). FIG. 15B is a rear view of the LCD (segment; SEG side).

As shown in FIG. 15A, the electrode on the COM side is divided into four regions or four electrodes. Specifically, the electrode on the COM side is composed of a first electrode 151, a second electrode 152 provided to the right of the first electrode 151, a third electrode 153 provided below the first electrode 151, and a fourth electrode 154 provided to the right of the third electrode 153 and below the second electrode 152. Wiring sections 151*a* to 154*a* are connected to the electrodes 151 to 154, respectively.

As shown in FIG. 15B, the electrode on the SEG side is divided into four regions or four electrodes. Specifically, the electrode on the SEG side is composed of a fifth electrode 155, a sixth electrode 156 provided to the right of the fifth electrode 155, a seventh electrode 157 provided below the fifth electrode, and an eighth electrode 158 provided to the right of the seventh electrode 157 and below the sixth electrode 156. Wiring sections 155*a* to 158*a* are connected to the electrodes 155 to 158, respectively.

Specifically, a first electrode (a first electrode pattern) corresponds to the third electrode 153 provided on the COM side of the negative-type LCD and includes a central region 153-1 and a first peripheral region 153-2. A third electrode (a third electrode pattern) corresponds to the first electrode 151, second electrode 152, and fourth electrode 154 provided on the COM side of the negative-type LCD and includes a second peripheral region (the electrode portions indicated by numeral 153-3).

A second electrode (a second electrode pattern) corresponds to the sixth electrode 156 provided on the SEG side of the negative-type LCD and includes a central region 156-1 and a second peripheral region 156-3. A fourth electrode (a fourth electrode pattern) corresponds to the fifth electrode 155, seventh electrode 157, and eighth electrode 158 provided on the SEG side of the negative-type LCD and includes a first peripheral region (the portions indicated by numeral 156-2).

Figures 16A, 16B, 16C:
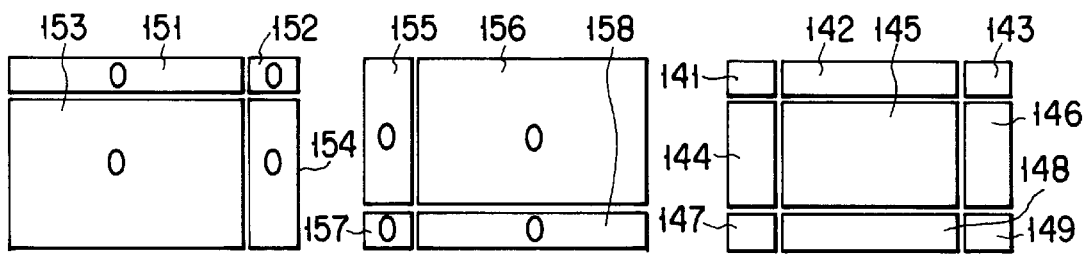
FIGS. 16A, 16B, and 16C show the display off state in the fourth embodiment, FIG. 16A showing the state of the electrodes on the COM side, FIG. 16B showing the state of the electrodes on the SEG side, and FIG. 16C showing the finder visual field range produced by the electrodes of FIGS. 16A and 16B.

FIGS. 16A, 16B, and 16C show the display off state in the fourth embodiment. FIG. 16A shows the state of the electrodes on the COM side. FIG. 16B shows the state of the electrodes on the SEG side. FIG. 16C shows the finder visual field range produced by the electrodes of FIGS. 16A and 16B.

In the display off state, no signal is supplied to the first to fourth electrodes 151 to 154 as shown in FIG. 16A, presenting the "0" state. Similarly, no signal is supplied to the fifth to eighth electrodes 155 to 158 as shown in FIG. 16B, presenting the "0" state. As a result, the visual field range composed of the regions 141 to 149 goes into the shading state.

Figures 17A, 17B, 17C:
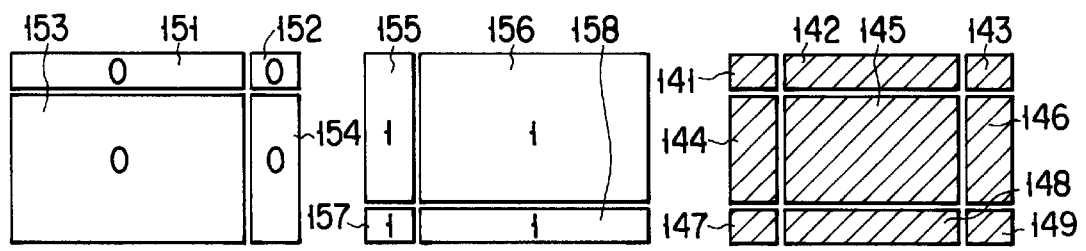
FIGS. 17A, 17B, and 17C illustrate an angle of view for highvision display in the fourth embodiment, FIG. 17A showing the relationship between the electrodes on the COM side and the supplied signals, FIG. 17B showing the relationship between the electrodes on the SEG side and the supplied signals, and FIG. 17C showing an angle of view for highvision display produced from FIGS. 17A and 17B.

In highvision display, signal "0" is supplied to the first to fourth electrodes 151 to 154 on the COM side as shown in FIG. 17A and signal "1" is supplied to the fifth to eighth electrodes 155 to 158 on the SEG side as shown in FIG. 17B. As a result, all the four electrodes on the SEG side have the opposite phase to that of the electrodes on the COM side, bringing all the regions 141 to 149 in the visual field range into the transmitting state as shown in FIG. 17C. In FIG. 17C, the shaded portions are in the transmitting state.

Figures 18A, 18B, 18C:
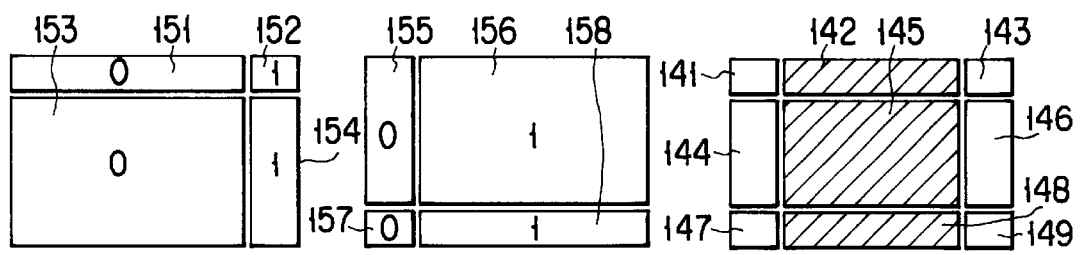
FIGS. 18A, 18B, and 18C illustrate an angle of view for classic display in the fourth embodiment, FIG. 18A showing the relationship between the electrodes on the COm side and the supplied signals, FIG. 18B showing the relationship between the electrodes on the SEG side and the supplied signals, and FIG. 18C showing an angle of view for classic display produced from FIGS. 18A and 18B.

In classic display, signal "0" is supplied to the first electrode 51 and third electrode 153 and signal "1" is supplied to the second electrode 152 and fourth electrode 154 on the COM side as shown in FIG. 18A. On the other hand, signal "0" is supplied to the fifth electrode 155 and seventh electrode 157 and signal "1" is supplied to the sixth electrode 156 and eighth electrode 158 on the SEG side as shown in FIG. 18B.

As a result, as shown in FIG. 18C, the sections where the COM-side electrodes overlap with the SEG-side electrodes in the region 142, 145, and 148 of the visual field range have the opposite phase, presenting the transmitting state (the shaded portions). In this case, in the regions 141, 143, 144, 146, 147, 149, the COM-side electrodes are in phase with the SEG-side electrodes, presenting the shading state.

Figures 19A, 19B, 19C:
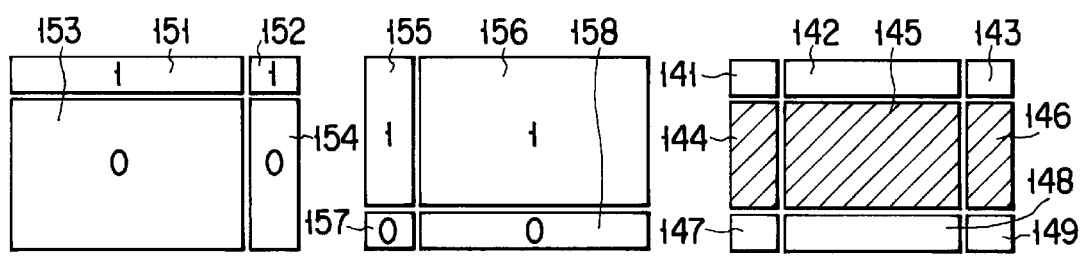
FIGS. 19A, 19B, and 19C illustrate an angle of view for panorama display in the fourth embodiment, FIG. 19A showing the relationship between the electrodes on the COM side and the supplied signals, FIG. 19B showing the relationship between the electrodes on the SEG side and the supplied signals, and FIG. 19C showing an angle of view for panorama display produced from FIGS. 19A and 19B.

In panorama display, as shown in FIG. 19A, signal "1" is supplied to the first electrode 151 and second electrode 152 and signal "0" is supplied to the third electrode 153 and fourth electrode 154 on the COM side. On the other hand, signal "1" is supplied to the fifth electrode 155 and sixth electrode 156 and signal "0" is supplied to the seventh electrode 157 and eighth electrode 158 on the SEG side.

As a result, as shown in FIG. 19C, the sections where the COM-side electrodes overlap with the SEG-side electrodes in the regions 144 to 146 of the visual field range have the opposite phase, presenting the transmitting state (the shaded portions). In this case, in the regions 141 to 143 and 147 to 149, the COM-side electrodes are in phase with the SEG-side electrodes, presenting the shading state.

With such a layout of the electrodes, since the electrodeless inter-electrode regions cross each other and do not overlap each other in the same direction, a shift in the lamination of the COM side pattern and the SEG side pattern would not permit the inter-electrode regions to make two lines.

(Fifth Embodiment)

Figure 20A:
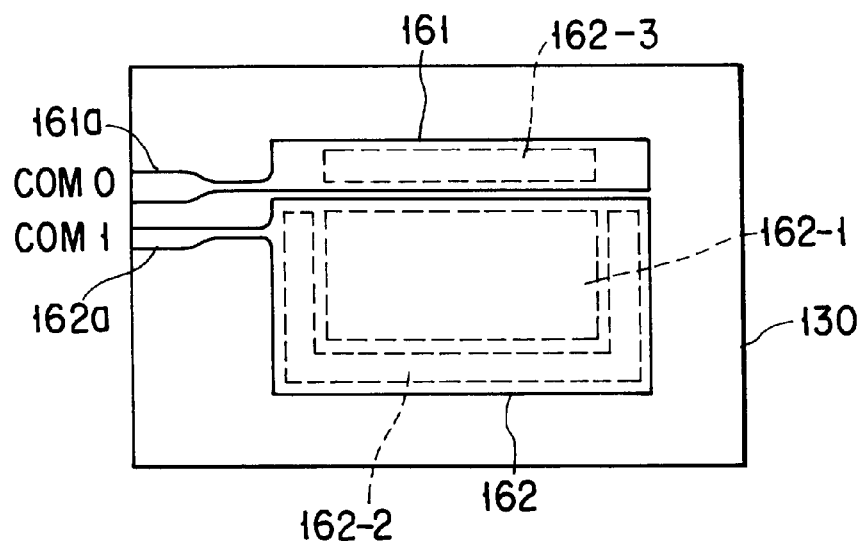
FIGS. 20A and 20B show a layout of the electrodes of a display device using a negative-type LCD for the finder of a camera according to a fifth embodiment of the present invention, FIG. 20A being a front view of the LCD (common; COM side) and FIG. 20B being a rear view of the LCD (segment; SEG side)
Figure 20B:
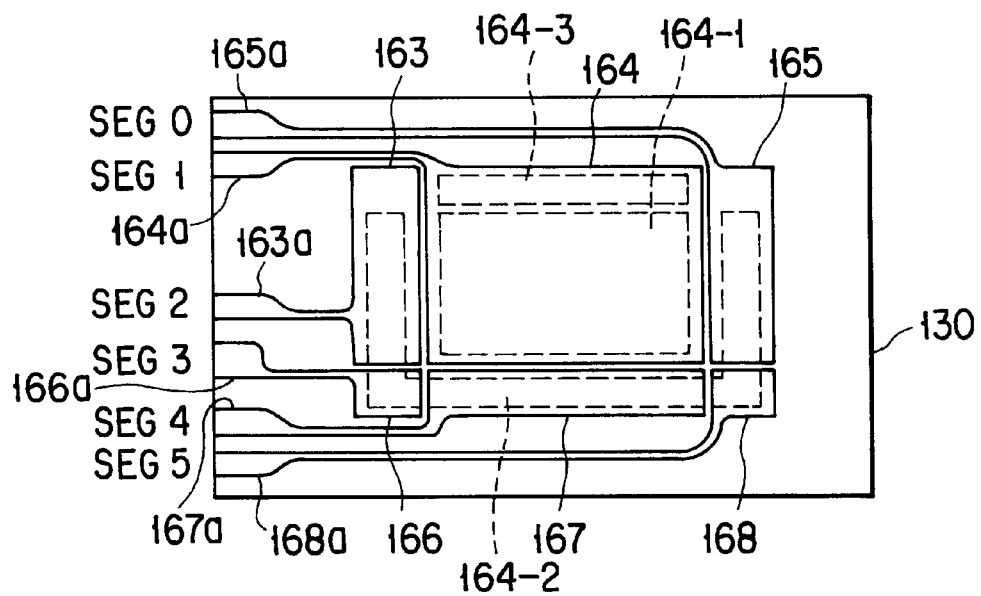
Figure 25A:
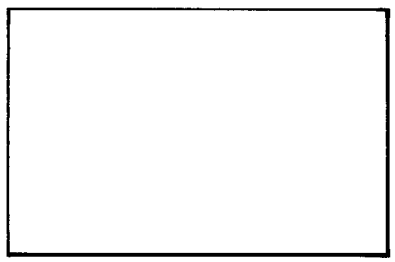
FIGS. 25A, 25B, 25C illustrate the display of an angle of view in a camera, FIG. 25A showing an angle of view for highvision display, FIG. 25B showing an angle of view for classic display, and FIG. 25C showing an angle of view for panorama display.
Figure 25B:
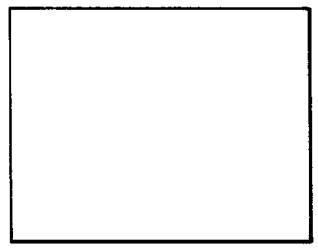
Figure 25C:
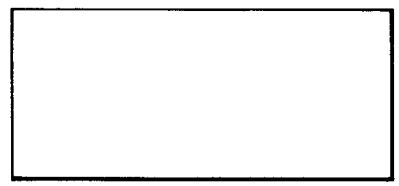

FIGS. 20A and 20B relate to a fifth embodiment of the present invention and show a layout of the electrodes of a display device using a negative-type LCD for the finder of a camera. FIG. 20A is a front view of the LCD (common; COM side). FIG. 20B is a rear view of the LCD (segment; SEG side).

As shown in FIG. 20A, the electrode on the COM side is divided into two regions or two electrodes. Specifically, the electrode on the COM side is composed of a first electrode 161 and a second electrode 162 provided below the first electrode 161. Wiring sections 161a and 162a are connected to the first and second electrodes 161 and 162, respectively.

As shown in FIG. 20B, the electrode on the SEG side is divided into six regions or six electrodes. Specifically, the electrode on the SEG side is composed of a third electrode 163, a fourth electrode 164 provided to the right of the third electrode 163, a fifth electrode 165 provided to the right of the fourth electrode 164, a sixth electrode 166 provided below the third electrode 163, a seventh electrode 167 provided to the right of the sixth electrode 166 and below the fourth electrode 164, and an eighth electrode 168 provided below the fifth electrode and to the right of the seventh electrode. Wiring sections 163a to 168a are connected to the electrodes 163 to 168, respectively.

Specifically, a first electrode (a first electrode pattern) corresponds to the second electrode 162 provided on the COM side of the negative-type LCD and includes a central region 162-1 and a first peripheral region 162-2. A third electrode (a third electrode pattern) corresponds to the first electrode 161 provided on the COM side of the negative-type LCD and includes a second peripheral region (the electrode portions indicated by numeral 162-3).

A second electrode (a second electrode pattern) corresponds to the second electrode 164 provided on the SEG side of the negative-type LCD and includes a central region 164-1 and a second peripheral region 164-3. A fourth electrode (a fourth electrode pattern) corresponds to the third electrode 163, fifth electrode 165 to eighth electrode 168 provided on the SEG side of the negative-type LCD and includes a first peripheral region (the portion indicated by numeral 164-2).

FIGS. 21A, 21B, and 21C show the display off state in the fifth embodiment. FIG. 21A shows the state of the electrodes on the COM side. FIG. 21B shows the state of the electrodes on the SEG side. FIG. 21C shows the finder visual field range produced by the electrodes of FIGS. 21A and 21B.

In the display off state, no signal is supplied to the first electrode 161 and second electrode 162 as shown in FIG. 21A, presenting the "0" state. Similarly, no signal is supplied to the third to eighth electrodes 163 to 168 as shown in FIG. 21B, presenting the "0" state. As a result, the visual field range composed of the regions 141 to 149 goes into the shading state.

In highvision display, signal "1" is supplied to the first electrode 161 and second electrode 162 on the COM side as shown in FIG. 22A and signal "0" is supplied to the third to eighth electrodes 163 to 168 on the SEG side as shown in FIG. 22B. As a result, all the six electrodes on the SEG side have the opposite phase to that of the electrodes on the COM side, bringing all the regions 141 to 149 in the visual field range into the transmitting state as shown in FIG. 22C. In FIG. 22C, the shaded portions are in the transmitting state.

In classic display, signal "1" is supplied to the first electrode 161 and second electrode 162 on the COM side as shown in FIG. 23A. On the other hand, signal "1" is supplied to the third electrode 163, fifth electrode 165, sixth electrode 166, and eighth electrode 168 and signal "0" is supplied to the fourth electrode 164 and seventh electrode 167 on the SEG side as shown in FIG. 23B.

As a result, as shown in FIG. 23C, the sections where the COM-side electrodes overlap with the SEG-side electrodes in the region 142, 145, and 148 of the visual field range have the opposite phase, presenting the transmitting state (the shaded portions). In this case, in the regions 141, 143, 144, 146, 147, 149, the COM-side electrodes are in phase with the SEG-side electrodes, presenting the shading state.

In panorama display, as shown in FIG. 24A, signal "0" is supplied to the first electrode 161 and signal "1" is supplied to the second electrode 162 on the COM side. On the other hand, signal "0" is supplied to the third to fifth electrode 163 to 165 and signal "1" is supplied to the sixth to eighth electrode 166 to 168 on the SEG side.

As a result, as shown in FIG. 24C, the sections where the COM-side electrodes overlap with the SEG-side electrodes in the region 144 to 146 of the visual field range have the opposite phase, presenting the transmitting state (the shaded portions). In this case, in the regions 141 to 143 and 147 to 149, the COM-side electrodes are in phase with the SEG-side electrodes, presenting the shading state.

With such a layout of the electrodes, since the electrodeless inter-electrode regions cross each other and do not overlap each other in the same direction, a shift in the lamination of the COM side pattern and the SEG side pattern would not permit the inter-electrode regions to make two lines.

While in the third to fifth embodiments, one example of each of the COM-side electrode arrangement and the SEG-side electrode arrangement has been explained, the present invention is not limited to these. For instance, in FIGS. 9A, 9B, FIGS. 11A to 11C, and FIGS. 24A to 24C, the shapes of the top and bottom electrodes may be replaced with those of the right and left electrodes. Alternatively, the shapes of the electrodes may be replaced with those viewed from under the drawing paper.

Although in the above embodiments, the present invention has been applied to the finder of a camera, it may be applied to a part other than the finder.

With the above embodiments, it is possible to provide a display device which prevents the quality of visual field of a finder from deteriorating without increasing the accuracy of the alignment of the front pattern with the back pattern in a liquid crystal capable of changing the angle of view.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device for a camera which uses a liquid crystal to make a display in a desired one of plural screen sizes in a finder visual field of the camera, comprising:

a first face electrode which is provided on a first face of the liquid crystal and which comprises plural electrodes and a first linear inter-electrode region, the first linear interelectrode region being a region between the plural electrodes where no electrode exists; and a second face electrode which is provided on a second face facing the first face of the liquid crystal and which comprises plural electrodes and a second linear inter-electrode region, the second linear inter-electrode region being a region between the plural electrodes where no electrode exists, wherein a central region enclosed only by the first linear inter-electrode region and the second linear inter-electrode region is formed in the finder visual field of the camera, wherein the first and second linear inter-electrode regions comprise respective linear portions which are arranged to cross each other, with the liquid crystal interposed therebetween, and wherein the display in the desired one of the plural screen sizes in the finder visual field of the camera is achieved by supplying driving signals to the first face electrode and second face electrode.

2. A display device according to claim 1, wherein the liquid crystal is a negative-type liquid crystal.

3. A display device according to claim 1, wherein the liquid crystal is a macromolecular-dispersion-type liquid crystal.

4. A display device according to claim 1, wherein three electrodes are provided on the first face and three electrodes are provided on the second face.

5. A display device according to claim 1, wherein four electrodes are provided on the first face and four electrodes are provided on the second face.

6. A display device according to claim 1, wherein one of said first and second faces is provided with two electrodes and the other of said first and second faces is provided with six electrodes.

7. A display device according to claim 1, wherein the plural screen sizes are at least three in number.

8. A display device according to claim 1, wherein the first linear inter-electrode region overlaps with the second linear inter-electrode region only at where the respective linear portions thereof cross each other.

* * * * *